(12) United States Patent
Higuchi

(10) Patent No.: US 8,194,130 B2
(45) Date of Patent: Jun. 5, 2012

(54) MONITORING CAMERA DEVICE, DEHUMIDIFYING DEVICE, DEHUMIDIFYING METHOD, AND DEHUMIDIFYING PROGRAM

(75) Inventor: Kazutaka Higuchi, Kanagawa (JP)

(73) Assignee: Panasonic Corporation, Osaka (JP)

( * ) Notice: Subject to any disclaimer, the term of this patent is extended or adjusted under 35 U.S.C. 154(b) by 918 days.

(21) Appl. No.: 12/281,180

(22) PCT Filed: Mar. 30, 2007

(86) PCT No.: PCT/JP2007/057193
§ 371 (c)(1),
(2), (4) Date: Aug. 29, 2008

(87) PCT Pub. No.: WO2007/114365
PCT Pub. Date: Oct. 11, 2007

(65) Prior Publication Data
US 2009/0015673 A1 Jan. 15, 2009

(30) Foreign Application Priority Data
Mar. 31, 2006 (JP) .................................. 2006-099738

(51) Int. Cl.
*H04N 7/18* (2006.01)
(52) U.S. Cl. ....................................................... 348/143
(58) Field of Classification Search .................. 348/143, 348/151, 373
See application file for complete search history.

(56) References Cited

U.S. PATENT DOCUMENTS

| 4,745,766 A | * | 5/1988 | Bahr ............................ 62/176.6 |
| 5,096,549 A | | 3/1992 | Yamauchi et al. |
| 7,549,808 B2 | * | 6/2009 | Sakigawara et al. .......... 396/427 |

FOREIGN PATENT DOCUMENTS

| DE | 4027353 A1 | 4/1991 |
| JP | 2003-143449 | 5/2003 |
| JP | 2005-215463 | 8/2005 |
| JP | 2005-260923 | 9/2005 |

OTHER PUBLICATIONS

International Search Report for PCT/JP2007/057193; completed on May 21, 2007.
Supplementary European Search Report for PCT/JP2007/057193 dated Aug. 5, 2011.

* cited by examiner

*Primary Examiner* — David Eng
(74) *Attorney, Agent, or Firm* — Pearne & Gordon LLP

(57) ABSTRACT

A surveillance camera (1) comprises a camera housing (2), a dehumidifying element (3) provided in the camera housing (2), a current value detection unit (8) that detects the value of the drive current applied to the dehumidifying element (3), a target current value determination unit (10) that determines a target current value (It), on the basis of a first current value (I0) detected at the period start time (t0) of a predetermined current change judgment period and a second current value (I1) detected at the period end time (t1) of the period, and a voltage control unit (13) that controls the drive voltage applied to the dehumidifying element (3). The dehumidifying element (3) is driven at the target current value (It) until target time (t2) to remove a target dehumidification amount (S) from the camera housing (2) by the target time (t2). There is thus provided the surveillance camera (1) capable of quickly removing moisture when the humidity in the camera housing (2) is high.

10 Claims, 7 Drawing Sheets

MONITORING CAMERA DEVICE, DEHUMIDIFYING DEVICE, DEHUMIDIFYING METHOD, AND DEHUMIDIFYING PROGRAM

TECHNICAL FIELD

The present invention relates to a surveillance camera having a dehumidification capability.

BACKGROUND ART

Hitherto, as a surveillance camera having a dehumidification capability, a surveillance camera in which a dehumidifying element is attached to a camera housing has been known. For example, Japanese Patent Laid-Open No. 2005-260923 (pages 4 to 10, FIG. 1) discloses such a surveillance camera. The dehumidifying element has a configuration in which a polymer electrolyte membrane is sandwiched between an anode electrode film and a cathode electrode film. In the surveillance camera of the related art, a drive voltage is applied between the two electrode films of the dehumidifying element to dehumidify the interior of the camera housing.

In the surveillance camera of the related art, when a drive voltage is applied between the two electrode films, water molecules in the camera housing are electrolyzed into hydrogen ions and oxygen ions on the anode (moisture-removing-side) electrode film. In this case, the polymer electrolyte membrane serves as a hydrogen ion exchange membrane, and the hydrogen ions move to the cathode (moisture-discharging-side) electrode film. On the cathode electrode film, the hydrogen ions react with oxygen in the air, and water molecules are formed. Thus, the interior of the camera housing is dehumidified by moving the moisture in the air on the anode side of the dehumidifying element into the air on the cathode side.

However, in the surveillance camera of the related art, the drive voltage applied to the dehumidifying element is fixed irrespective of the humidity in the camera housing. Therefore, when the humidity in the camera housing is high, it takes relatively long time to lower the humidity in the camera housing.

For example, FIG. 7 is a graph for explaining how the surveillance camera of the related art described above is dehumidified. As shown in FIG. 7, when the power supply for the dehumidifying element is turned on at time t0, a large number of hydrogen ions pass through the polymer electrolyte membrane of the dehumidifying element when the humidity in the camera housing is high, and hence a large value of drive current I0 is applied to the dehumidifying element. Since the drive voltage applied to the dehumidifying element is fixed in the surveillance camera of the related art, the drive current through the dehumidifying element gradually decreases at a substantially constant rate as the humidity in the camera housing decreases. After the drive current applied to the dehumidifying element decreases to the smallest current value Imin at time t7, the dehumidifying element will then keep operating at the smallest current value (standby current). As described above, in the surveillance camera of the related art, it takes relatively long time to lower the humidity in the camera housing when the humidity therein is high.

To dehumidify the interior of the camera housing in accordance with the humidity therein, it is conceivable to use a hygrometer that measures the humidity in the camera housing. In this case, however, it is necessary to provide a space for attaching the hygrometer in the camera housing, and an extra cost of the hygrometer is also required.

DISCLOSURE OF THE INVENTION

Problems to be Solved by the Invention

The present invention has been made in view of the above background. An object of the present invention is to provide a surveillance camera capable of quickly removing moisture when the humidity in the camera housing is high.

Means for Solving the Problems

An aspect of the present invention is a surveillance camera comprising a camera housing, a dehumidifying element provided in the camera housing, a current value detection unit that detects the value of the drive current applied to the dehumidifying element, a target current value determination unit that determines the value of a target current applied to the dehumidifying element until a predetermined target time in such a way that a predetermined target dehumidification amount is removed from the camera housing by the target time based on a first current value detected at the period start time of a predetermined current change judgment period and a second current value detected at the period end time of the period, and a voltage control unit that controls the drive voltage applied to the dehumidifying element in such a way that the dehumidifying element is driven at the target current value until the target time.

Another aspect of the present invention is a dehumidifier comprising a dehumidifying element, a current value detection unit that detects the value of the drive current applied to the dehumidifying element, a target current value determination unit that determines the value of a target current applied to the dehumidifying element until a predetermined target time in such a way that a predetermined target dehumidification amount is removed by the target time based on a first current value detected at the period start time of a predetermined current change judgment period and a second current value detected at the period end time of the period, and a voltage control unit that controls the drive voltage applied to the dehumidifying element in such a way that the dehumidifying element is driven at the target current value until the target time.

Another aspect of the present invention is a dehumidification method comprising the steps of detecting the value of the drive current applied to a dehumidifying element provided in a camera housing of a surveillance camera, determining the value of a target current applied to the dehumidifying element until a predetermined target time in such a way that a predetermined target dehumidification amount is removed from the camera housing by the target time based on a first current value detected at the period start time of a predetermined current change judgment period and a second current value detected at the period end time of the period, and controlling the drive voltage applied to the dehumidifying element in such a way that the dehumidifying element is driven at the target current value until the target time.

Another aspect of the present invention is a dehumidification program for implementing a dehumidification capability of a surveillance camera based on the value of the drive current applied to a dehumidifying element provided in a camera housing of the surveillance camera. The program causes a computer to execute the procedure of determining the value of a target current applied to the dehumidifying element until a predetermined target time in such a way that a predetermined target dehumidification amount is removed from the camera housing by the target time based on a first current value detected at the period start time of a predetermined current change judgment period and a second current value detected at the period end time of the period, and the procedure of controlling the drive voltage applied to the dehumidifying element in such a way that the dehumidifying element is driven at the target current value until the target time.

As will be described below, the present invention encompasses other aspects. Therefore, it is intended that the disclosure of the present invention provides part of the aspects of the present invention, and it is not intended that the disclosure of the present invention limits the scope of the present invention set forth and claimed herein.

DESCRIPTION OF SYMBOLS

Figure 1:
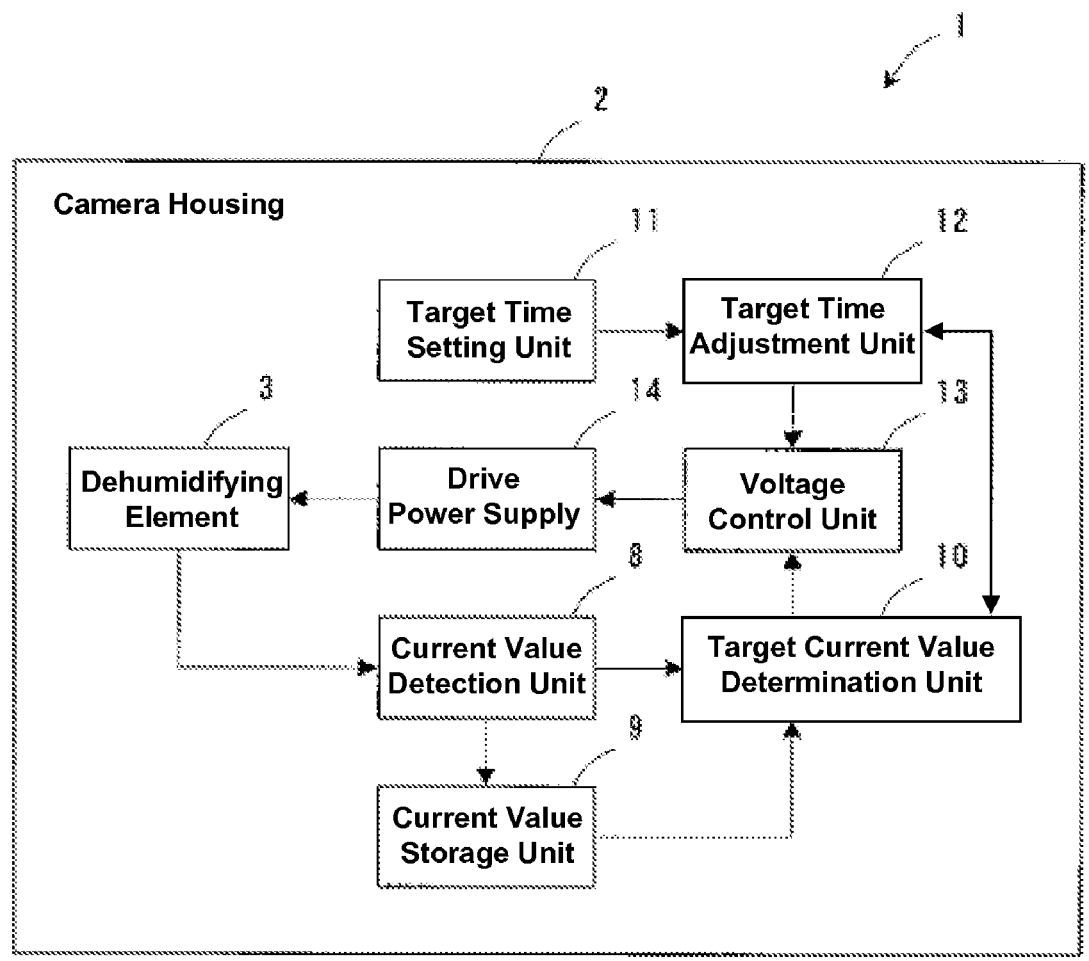
FIG. 1 is a block diagram of a surveillance camera in an embodiment of the present invention.

1 Surveillance camera
2 Camera housing
3 Dehumidifying element
8 Current value detection unit
9 Current value storage unit
10 Target current value determination unit
11 Target time setting unit
12 Target time adjustment unit
13 Voltage control unit
14 Drive power supply

BEST MODE FOR CARRYING OUT THE INVENTION

The present invention will be described below in detail. However, the following detailed description and the accompanying drawings do not limit the present invention. Instead, the scope of the present invention is limited by the appended claims.

A surveillance camera of the present invention comprises a camera housing, a dehumidifying element provided in the camera housing, a current value detection unit that detects the value of the drive current applied to the dehumidifying element, a target current value determination unit that determines the value of a target current applied to the dehumidifying element until a predetermined target time in such a way that a predetermined target dehumidification amount is removed from the camera housing by the target time based on a first current value detected at the period start time of a predetermined current change judgment period and a second current value detected at the period end time of the period, and a voltage control unit that controls the drive voltage applied to the dehumidifying element in such a way that the dehumidifying element is driven at the target current value until the target time.

With such a configuration, the target current value, at which the predetermined target dehumidification amount is removed from the camera housing by the predetermined target time, can be determined based on the first and second current values in the predetermined current change judgment period. That is, the target current value can be estimated based on the first and second current values without using a hygrometer. The drive voltage applied to the dehumidifying element is then controlled to drive the dehumidifying element at the target current value until the target time. The target dehumidification amount is thus removed by the target time. Moisture can therefore be quickly removed when the humidity in the camera housing is high.

The surveillance camera of the present invention may have a configuration in which the target current value determination unit determines the target dehumidification amount based on the change in the first and second current values.

With such a configuration, the target dehumidification amount to be removed from the camera housing by the predetermined target time can be determined based on the change in the first and second current values. That is, the target dehumidification amount can be estimated based on the change in the first and second current values without using a hygrometer, and the target dehumidification amount can be used to determine the target current value.

The surveillance camera of the present invention may have a configuration in which the period start time of the current change judgment period is set to a point immediately after the operation of the dehumidifying element is initiated.

With such a configuration, moisture can be quickly removed when the humidity in the camera housing is high, for example, immediately after the operation of the dehumidifying element is initiated.

The surveillance camera of the present invention may be configured to further comprise a target time adjustment unit that adjusts the target time to an appropriate target time so that the target current value is an appropriate target current value smaller than or equal to the largest current value for the dehumidifying element.

With such a configuration, when the target current value exceeds the largest current value, the target time adjustment unit extends the target time. This operation prevents the drive current applied to the dehumidifying element from exceeding the largest current value for the dehumidifying element. On the other hand, when the target current value is below the largest current value, the target time adjustment unit moves up the target time. Moisture can thus be removed more quickly.

A dehumidifier of the present invention comprises a dehumidifying element, a current value detection unit that detects the value of the drive current applied to the dehumidifying element, a target current value determination unit that determines the value of a target current applied to the dehumidifying element until a predetermined target time in such a way that a predetermined target dehumidification amount is removed by the target time based on a first current value detected at the period start time of a predetermined current change judgment period and a second current value detected at the period end time of the period, and a voltage control unit that controls the drive voltage applied to the dehumidifying element in such a way that the dehumidifying element is driven at the target current value until the target time.

With such a configuration, moisture can be quickly removed when the humidity in the camera housing is high, as in the case described above.

The dehumidifier of the present invention may have a configuration in which the target current value determination unit determines the target dehumidification amount based on the change in the first and second current values.

With such a configuration, the target dehumidification amount can be estimated based on the change in the first and second current values without using a hygrometer, and the target dehumidification amount can be used to determine the target current value, as in the case described above.

The dehumidifier of the present invention may have a configuration in which the period start time of the current change judgment period is set to a point immediately after the operation of the dehumidifying element is initiated.

With such a configuration, moisture can be quickly removed when the humidity in the camera housing is high, for example, immediately after the operation of the dehumidifying element is initiated, as in the case described above.

The dehumidifier of the present invention may be configured to further comprise a target time adjustment unit that adjusts the target time to an appropriate target time so that the target current value is an appropriate target current value smaller than or equal to the largest current value for the dehumidifying element.

With such a configuration, when the target current value exceeds the largest current value, the drive current applied to the dehumidifying element will not exceed the largest current value for the dehumidifying element, as in the case described above. On the other hand, when the target current value is below the largest current value, moisture can be removed more quickly.

A dehumidification method of the present invention comprises the steps of detecting the value of the drive current applied to a dehumidifying element provided in a camera housing of a surveillance camera, determining the value of a target current applied to the dehumidifying element until a predetermined target time in such a way that a predetermined target dehumidification amount is removed from the camera housing by the target time based on a first current value detected at the period start time of a predetermined current change judgment period and a second current value detected at the period end time of the period, and controlling the drive voltage applied to the dehumidifying element in such a way that the dehumidifying element is driven at the target current value until the target time.

With such a method, moisture can be quickly removed when the humidity in the camera housing is high, as in the case described above.

A dehumidification program of the present invention is a program for implementing a dehumidification capability of a surveillance camera based on the value of the drive current applied to a dehumidifying element provided in a camera housing of the surveillance camera. The program causes a computer to execute the procedure of determining the value of a target current applied to the dehumidifying element until a predetermined target time in such a way that a predetermined target dehumidification amount is removed from the camera housing by the target time based on a first current value detected at the period start time of a predetermined current change judgment period and a second current value detected at the period end time of the period, and the procedure of controlling the drive voltage applied to the dehumidifying element in such a way that the dehumidifying element is driven at the target current value until the target time.

With such a program, moisture can be quickly removed when the humidity in the camera housing is high, as in the case described above.

In the present invention, by providing the target current value determination unit that determines the target current value based on the first and second current values and the voltage control unit that drives the dehumidifying element at the target current value until the target time, a target dehumidification amount can be removed by the target time and hence moisture can be quickly removed when the humidity in the camera housing is high.

The surveillance camera according to an embodiment of the present invention will be described below with reference to the drawings. In the embodiment, a surveillance camera for outdoor use having a dehumidification capability is shown by way of example. The dehumidification capability of the surveillance camera is implemented by executing a program stored in a memory in the surveillance camera. In other words, the surveillance camera has a dehumidifier according to the embodiment of the present invention is attached thereto.

Figure 2:
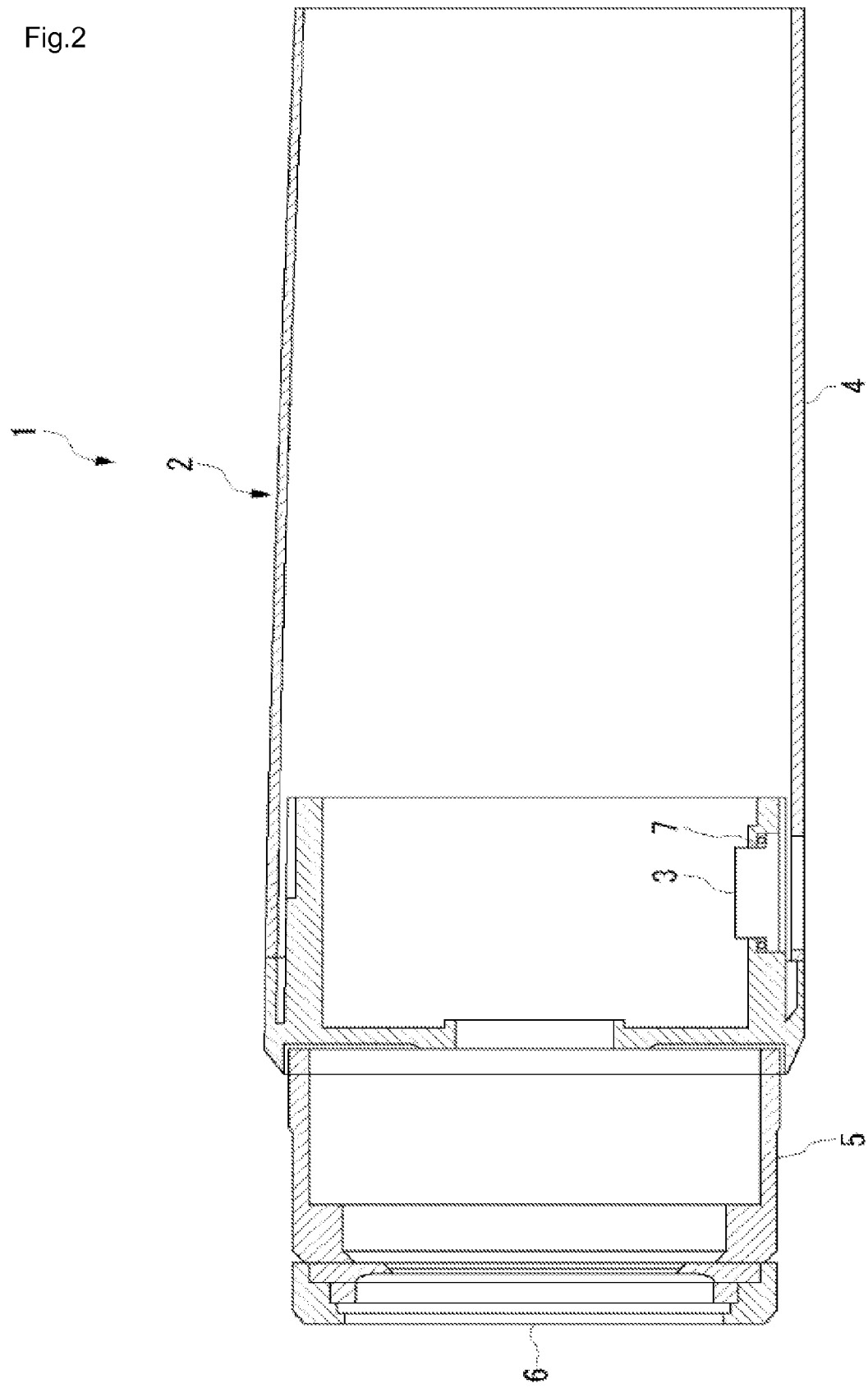
FIG. 2 is a cross-sectional view of the surveillance camera in the embodiment of the present invention.

FIGS. 1 and 2 show the surveillance camera according to the embodiment of the present invention. FIG. 1 is a block diagram of the surveillance camera 1 of the embodiment. FIG. 2 is a cross-sectional view of the surveillance camera 1. As shown in FIGS. 1 and 2, a dehumidifying element 3 is provided in a camera housing 2 of the surveillance camera 1. The camera housing 2 includes a tubular housing body 4 and a lens housing 5 attached to the front of the housing body 4. A transparent lens cover 6 is attached to the front end of the lens housing 5.

The dehumidifying element 3 is attached into an attachment hole 7 in the housing body 4. The interior space in the housing body 4 is communicated with the interior space in the lens housing 5. The dehumidifying element 3 can therefore dehumidify the interiors of the housing body 4 and the lens housing 5. The lens cover 6 for the lens housing 5 can thus be defogged.

Although not shown in FIGS. 1 and 2, in the surveillance camera 1 of the embodiment, other various components, such as a lens, a CCD, and a power supply, are provided in the camera housing 2. Not particularly shown here, a CPU, a memory, and other elements used to perform various control operations, which will be described later, are provided in the camera housing 2.

As shown in FIG. 1, the surveillance camera 1 includes a current value detection unit 8 that detects the value of the drive current applied to the dehumidifying element 3 as well as a current value storage unit 9 that temporarily stores the current value detected by the current value detection unit 8. The current value detection unit 8 herein corresponds to a current value detection unit of the present invention.

The surveillance camera 1 further includes a target current value determination unit 10 that determines a target value of the current applied to the dehumidifying element 3 until a predetermined target time based on a first current value stored in the current value storage unit 9 and a second current value detected by the current detection unit 8. The target current value determination unit 10 is configured to estimate a target dehumidification amount to be removed from the camera housing 2 by the target time based on the change in current from the first current value to the second current value (difference between current values), as will be described later, so as to determine the target current value based on the target dehumidification amount and the target time (see FIG. 4). The target current value determination unit 10 herein corresponds to a target current value determination unit of the present invention.

The surveillance camera 1 further includes a target time setting unit 11 that sets the predetermined target time (30 minutes, for example). The target time is a roughly estimated time in which the camera housing 2 is dehumidified, and a user of the surveillance camera 1, for example, sets the target time through a target time setting operation.

The surveillance camera 1 further includes a target time adjustment unit 12 that adjusts (extends or shortens) the target time to an appropriate target time so that the target current value becomes the largest current value (appropriate target current value) of the dehumidifying element 3. The target time adjustment unit 12 is configured to extend the target time when the target current value exceeds the largest current value, as will be described later (see FIG. 5). The target time adjustment unit 12 is also configured to move up the target time when the target current value is below the largest current value. The target time adjustment unit 12 herein corresponds to a target time adjustment unit of the present invention.

The surveillance camera 1 further includes a voltage control unit 13 that controls the drive voltage applied to the dehumidifying element 3 so that the dehumidifying element 3 is driven at the target current value until the target time. The voltage control unit 13 controls a drive power supply 14 for the dehumidifying element 3. The voltage control unit 13 herein corresponds to a voltage control unit of the present invention.

The dehumidification mechanism of the dehumidifying element 3 will be described with reference to FIG. 3. The dehumidifying element 3 has a configuration in which a polymer electrolyte membrane 17 is sandwiched between an anode electrode film 15 and a cathode electrode film 16. The anode electrode film 15 is connected to the anode of the drive power supply 14, and the cathode electrode film 16 is connected to the cathode of the drive power supply 14. In the embodiment, applying a drive voltage between the two electrode films 15 and 16 of the dehumidifying element 3 allows the interior of the camera housing 2 to be dehumidified.

Figure 3:
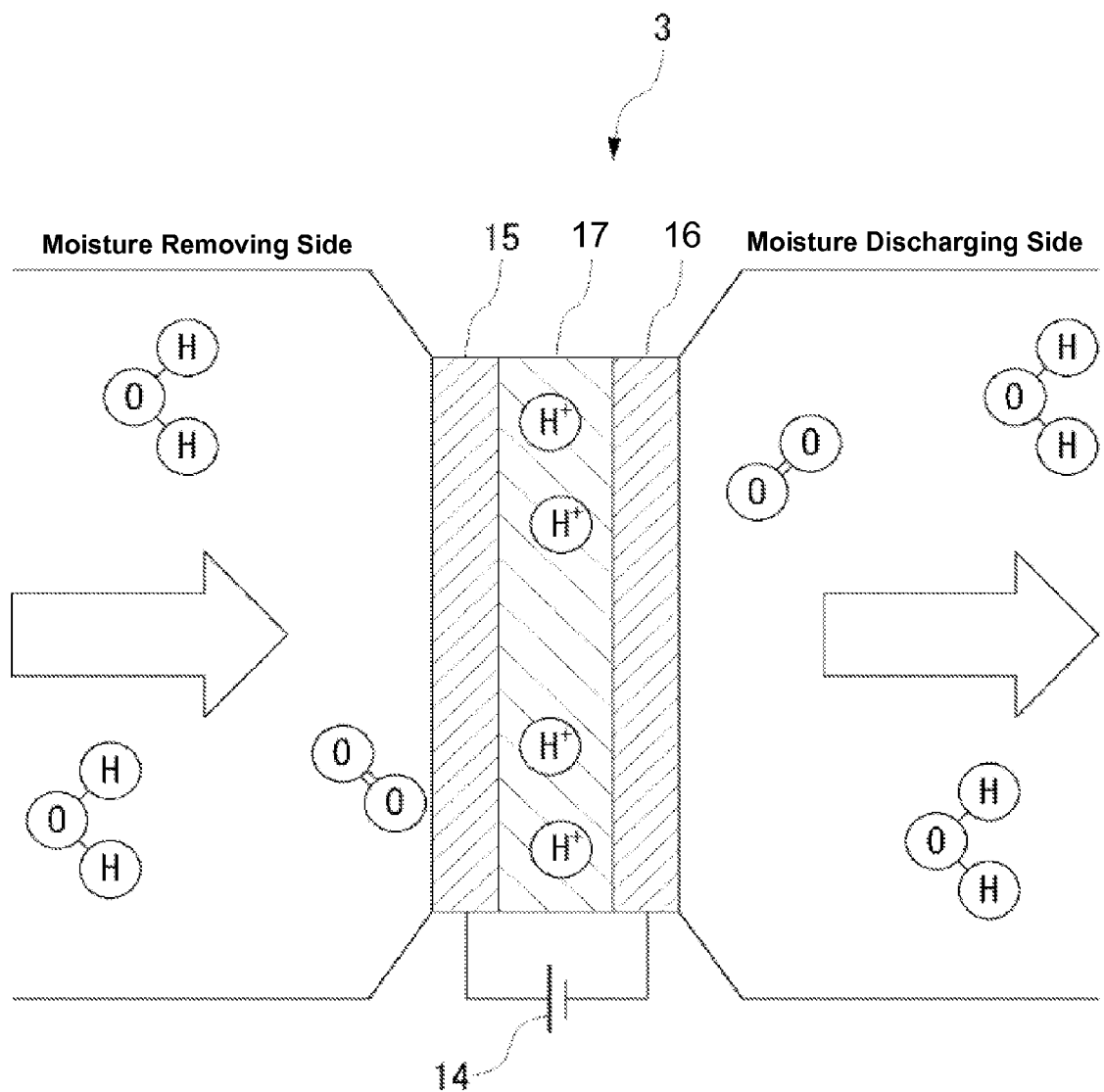
FIG. 3 is a descriptive view of a dehumidifier in the embodiment of the present invention.

In the embodiment, as shown in FIG. 3, when a drive voltage is applied between the two electrode films 15 and 16, water molecules in the camera housing 2 are electrolyzed into hydrogen ions and oxygen ions on the anode (moisture-removing-side) electrode film 15. In this case, the polymer electrolyte membrane 17 serves as a hydrogen ion exchange membrane, and the hydrogen ions move to the cathode (moisture-discharging-side) electrode film 16. On the cathode electrode film 16, the hydrogen ions react with oxygen in the air into water molecules. The interior of the camera housing 2 is dehumidified by thus moving the moisture in the air on the anode side of the dehumidifying element 3 into the air on the cathode side.

The operation of the thus configured surveillance camera 1 will be described with reference to FIGS. 4 to 6.

[Dehumidification Control Immediately after Start of Operation is Initiated]

In the surveillance camera 1 according to the embodiment of the present invention, when the main power supply in the surveillance camera 1 is turned on and hence the drive power supply 14 for the dehumidifying element 3 is turned on, the camera housing 2 is dehumidified. Such dehumidification control is herein referred to as dehumidification control immediately after the operation is initiated.

First, a description will be made of the operation of dehumidification control immediately after the operation is initiated after the drive power supply 14 for the dehumidifying element 3 has been turned off for a while. FIG. 4 is a graph showing how moisture is removed when the drive power supply 14 for the dehumidifying element 3 is turned on after the drive power supply 14 for the dehumidifying element 3 has been turned off for a while. After the drive power supply 14 for the dehumidifying element 3 has been turned off for a while, the humidity in the camera housing 2 has increased to a relatively large value.

Figure 7:
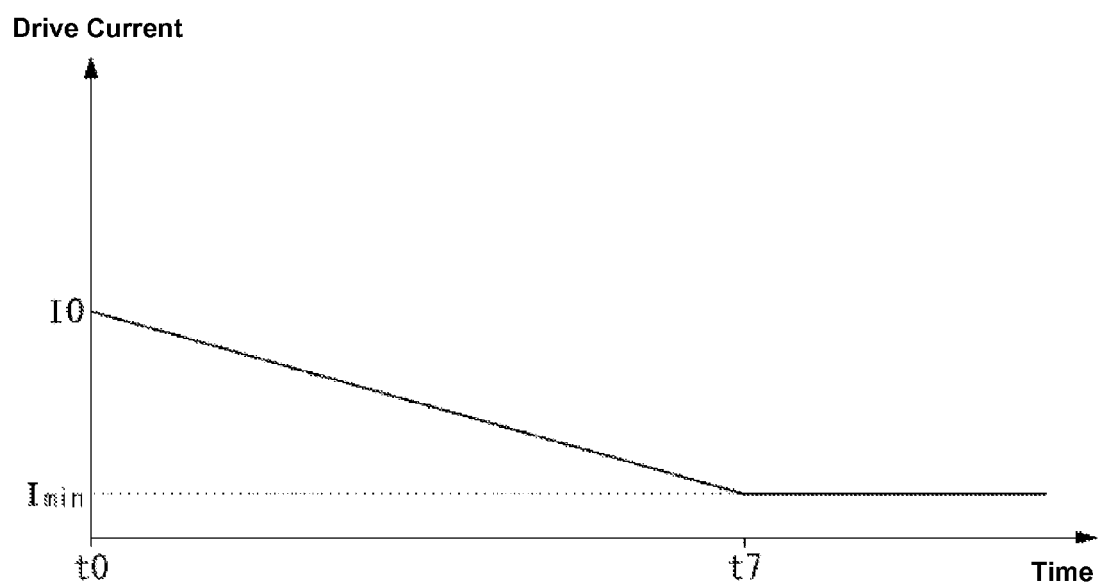
FIG. 7 is a graph for explaining how moisture is removed in related art.

When the main power supply in the surveillance camera 1 is turned on and hence the drive power supply 14 for the dehumidifying element 3 is turned on at time t0, the drive current applied to the dehumidifying element 3 is detected by the current value detection unit 8. For example, as shown in FIG. 4, after the drive power supply 14 for the dehumidifying element 3 has been turned off for a while and the humidity in the camera housing 2 has increased to a relatively large value, a drive current having a relatively large value I0 is applied to the dehumidifying element 3. The current value I0 at this point is stored in the current value storage unit 9 as a first current value. At this point, a drive voltage similar to that in the related art (normal drive voltage) is applied across the dehumidifying element 3. The value of the drive current is therefore similar to that in the related art (see FIG. 7).

The dehumidifying element 3 is then driven at a fixed drive voltage as in the related art until time t1 (five minutes, for example). At the time t1, the current value detection unit 8 detects the drive current applied to the dehumidifying element 3. During the above period, the dehumidification capability of the dehumidifying element 3 driven at the fixed drive voltage slightly lowers the humidity in the camera housing 2. The current value I1 detected at this point is smaller than the first current value I0. The current value I1 is a second current value.

The period from the time t0 to the time t1 corresponds to a current change judgment period of the present invention. That is, the time t0 corresponds to the period start time of the current change judgment period, and the time t1 corresponds to the period end time of the current change judgment period.

The first current value I0 at the time t0 and the second current value I1 at the time t1 are inputted to the target current value determination unit 10. The target current value determination unit 10 calculates the target dehumidification amount S based on the change in current during the current change judgment period from the time t0 to the time t1, that is, the difference between the first current value I0 and the second current value I1 (I0-I1). In this case, the target dehumidification amount S can be calculated by determining time t7 at which the current value becomes the smallest current value Imin in dehumidification carried out at the normal drive voltage (the same drive voltage as that in the related art). The target dehumidification amount S corresponds to the area S of the triangle whose base starts from t1 and ends at t7 in the graph shown in FIG. 4. The smallest current value Imin in the embodiment is the value of the dark current (standby current) in a standby mode.

The target current value determination unit 10 calculates a target current value It at which the target dehumidification amount S can be removed by target time t2 set in advance by the user (30 minutes, for example). In this case, the target current value It can be determined from the length of the longitudinal side (It-Imin) of the rectangle whose base starts from t1 and ends at t2 in the graph shown in FIG. 4.

The voltage control unit 13 then controls the drive voltage applied to the dehumidifying element 3 in such a way that the dehumidifying element 3 is driven at the target current value It until the target time t2. After the target time t2 has been reached, the dehumidifying element 3 is again driven at the normal drive voltage. In this case, since the camera housing 2 has been already dehumidified, the drive current applied to the dehumidifying element 3 has the smallest current value Imin.

[Temporal Adjustment Control]

A description will be made of the operation of the dehumidification control immediately after the operation is initiated after the drive power supply 14 for the dehumidifying element 3 has been turned off for a long period. FIG. 5 is a graph showing how moisture is removed when the drive power supply 14 for the dehumidifying element 3 is turned on after the drive power supply 14 for the dehumidifying element 3 has been turned off for a long period. After the drive power supply 14 for the dehumidifying element 3 has been turned off for a long period, the humidity in the camera housing 2 has increased to a significantly large value.

Figure 5:
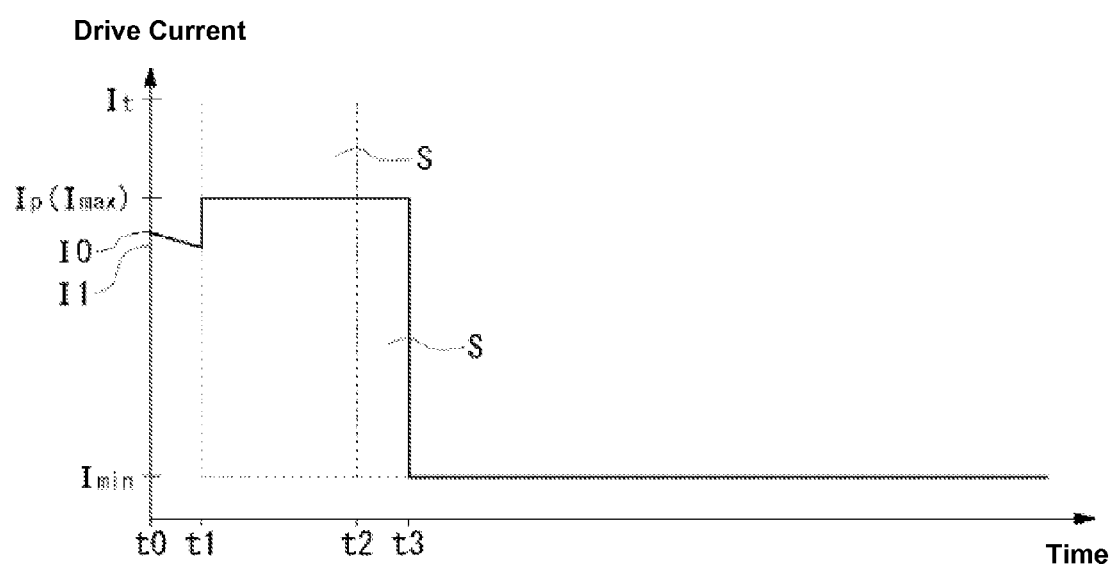
FIG. 5 is a graph for explaining how moisture is removed in the embodiment of the present invention.
Figure 6:
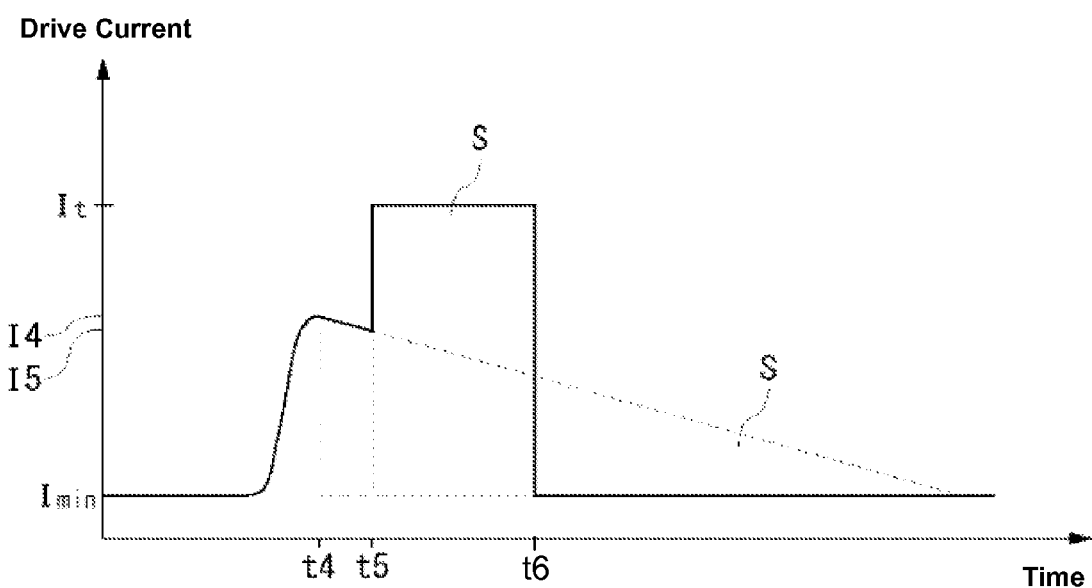
FIG. 6 is a graph for explaining how moisture is removed in another embodiment.

In this case, as in the case described above, when the target current value determination unit 10 calculates the target current value It based on the first current value I0 at the time t0 and the second current value I1 at the time t1, the target current value It may exceed the largest current value Imax for the dehumidifying element 3 in some cases depending on the target time t2, as shown in FIG. 5.

In such a case, the target time adjustment unit extends the target time t2 to an appropriate target time t3. In this case, the appropriate target time t3 can be determined from the length of the lateral side (t3-t1) of the rectangle having the area of the target dehumidification amount S by setting the length of the longitudinal side of the rectangle to (Imax-Imin) in the graph shown in FIG. 5.

The voltage control unit 13 controls the drive voltage applied to the dehumidifying element 3 in such a way that the dehumidifying element 3 is driven at an appropriate target current value Ip until the appropriate target time t3. In the embodiment, the appropriate target current value Ip is set to the largest current value Imax. After the target time t3 has been reached, the voltage applied to the dehumidifying element 3 returns to the normal drive voltage, and the drive current applied to the dehumidifying element 3 has the smallest current value Imin. The dehumidification control in which the target time is adjusted to an appropriate target time is herein referred to as temporal adjustment control.

The temporal adjustment control can be used when the humidity in the camera housing 2 is low, that is, when dehumidification control is applied immediately after the operation is initiated. That is, when the target current value determination unit 10 calculates the target current value It based on the first current value I0 at the time t0 and the second current value I1 at the time t1, the target current value It is below the largest current value Imax for the dehumidifying element 3 in some cases depending on the target time t2.

In this case, the target time adjustment unit moves up the target time t2 in such a way that the dehumidifying element 3 is driven at an appropriate target current value Ip (the largest current value Imax in the embodiment). The appropriate target time can be determined from the target dehumidification amount S, as in the case described above. The dehumidifying element 3 is driven at the appropriate target current value Ip until the appropriate target time. The voltage applied to the dehumidifying element 3 is then returns to the normal drive voltage, and the drive current applied to the dehumidifying element 3 has the smallest current value Imin.

According to the surveillance camera 1 of the embodiment of the present invention, by providing the target current value determination unit 10 that determines the target current value It based on the first current value I0 and the second current value I1 and the voltage control unit 13 that drives the dehumidifying element 3 at the target current value It until the target time t2, the target dehumidification amount S can be removed by the target time t2 and hence moisture can be quickly removed when the humidity in the camera housing 2 is high.

Figure 4:
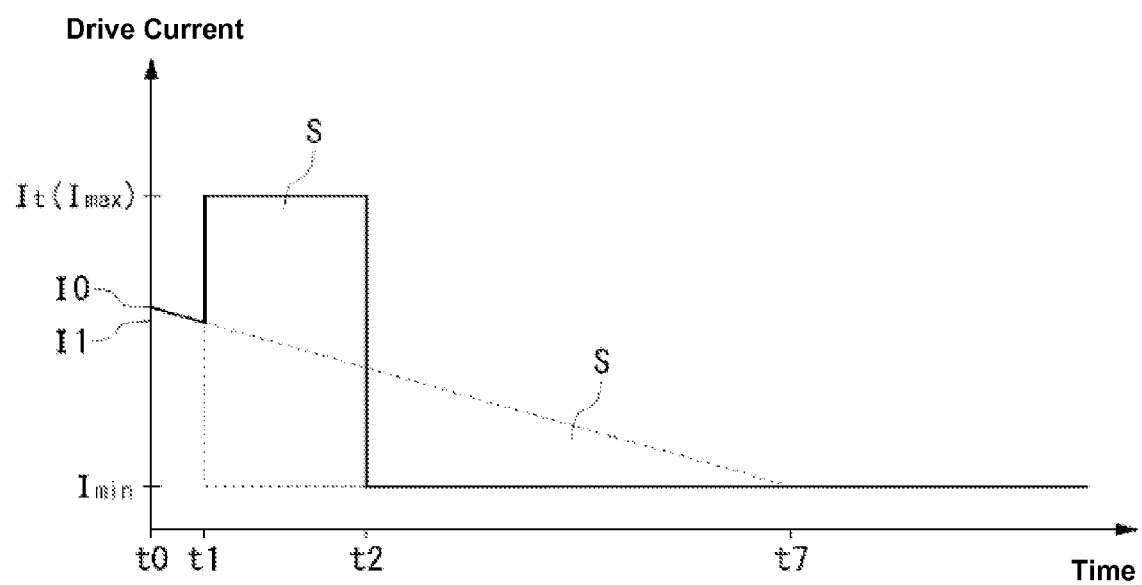
FIG. 4 is a graph for explaining how moisture is removed in the embodiment of the present invention.

That is, in the embodiment, as shown in the graph in FIG. 4, the target current value It, at which the target dehumidification amount S is removed from the camera housing 2 by the target time t2, can be determined based on the first current value I0 at the time t0 and the second current value I1 at the time t1. That is, the target current value It can be estimated based on the first current value I0 and the second current value I1 without separately using a hygrometer. The drive voltage applied to the dehumidifying element 3 is then controlled to drive the dehumidifying element 3 at the target current value It until the target time t2. The target dehumidification amount S is thus removed by the target time t2. Moisture can therefore be quickly removed when the humidity in the camera housing 2 is high.

Further, in the embodiment, as shown in the graph in FIG. 4, the target dehumidification amount S to be removed from the camera housing 2 by the target time t2 can be determined based on the change in the first current value I0 and the second current value I1. That is, the target dehumidification amount S can be estimated based on the change in the first current value I0 and the second current value I1 without separately using a hygrometer, and the target dehumidification amount S can be used to determine the target current value It.

In the embodiment, since the period start time (time t0) of the current change judgment period is set to a point immediately after the operation of the dehumidifying element 3 is initiated, moisture can be quickly removed when the humidity in the camera housing 2 is high, for example, immediately after the operation of the dehumidifying element 3 is initiated.

In the embodiment, as shown in the graph in FIG. 5, when the target current value It exceeds the largest current value Imax, the target time adjustment unit 12 extends the target time t2 to an appropriate target time t3. This operation prevents the drive current applied to the dehumidifying element 3 from exceeding the largest current value Imax for the dehumidifying element 3. On the other hand, when the target current value It is below the largest current value Imax, the target time adjustment unit 12 moves up the target time t2. Moisture can thus be removed more quickly.

In this case, since the appropriate target current value is set to the largest current value Imax, the dehumidifying element 3 can be driven at the largest current value Imax, and hence the dehumidification capability of the dehumidifying element 3 is maximized.

Further, since the dehumidifying element 3 is driven at a fixed target current value It (largest current value Imax) until the target time t2 (or an appropriate target time t3), the operation of the dehumidifying element 3 is more stable than a case where the drive current value frequently changes, and hence the burden on the dehumidifying element 3 is reduced.

The drive current applied to the dehumidifying element 3 has the smallest current value Imin after the target time t2 (or an appropriate target time t3) has been reached. That is, since the dehumidifying element 3 is driven at the fixed smallest current value Imin even after the target time has been reached, the operation of the dehumidifying element 3 is more stable than a case where the drive current value frequently changes, and hence the burden on the dehumidifying element 3 is reduced.

While the embodiment of the present invention has been described by way of example, the scope of the present invention is not limited thereto. Changes and modifications can be made in accordance with purposes within the scope set forth in the claims.

For example, the above description has been made with reference to the case where the target current value It is determined by evaluating the target dehumidification amount S based on the change in the first current value I0 and the second current value I1. The scope of the present invention, however, is not limited thereto. For example, the target current value It may be determined by preparing and using a data table that relates the first current value I0 and the second current value I1 to the target current value It.

Further, the above description has been made with reference to the case where the period start time (time t0) of the current change judgment period is set to a point immediately after the operation of the dehumidifying element 3 is initiated. The scope of the present invention, however, is not limited thereto. For example, as shown in FIG. 6, the dehumidification control may be applied when the humidity in the camera housing 2 increases during the operation of the dehumidifying element 3, for example, when the camera housing 2 is accidentally opened. For example, in the case shown in FIG. 6, the period start time of the current change judgment period is set to time t4 (corresponding to the time t0) and the period end time is set to time t5 (corresponding to the time t1). Dehumidification control is then applied in such a way that the target dehumidification amount S is removed by target time t6 (corresponding to the time t2). In this case, the dehumidification control may be automatically initiated, for example, when the value of the drive current exceeds a predetermined threshold value, or may be manually initiated by the user.

While a preferred embodiment of the present invention presently conceivable has been described above, it is understood that various modifications can be made to the embodiment, and it is intended that the appended claims encompass all such modifications within the true spirit and scope of the present invention.

INDUSTRIAL APPLICABILITY

As described above, the surveillance camera according to the present invention can advantageously remove a target dehumidification amount by a target time and quickly remove moisture when the humidity in the camera housing is high, and thus be useful, for example, as a surveillance camera for outdoor use.

The invention claimed is:

1. A surveillance camera comprising:
a camera housing;
a dehumidifying element provided in the camera housing;
a current value detection unit that detects the value of the drive current applied to the dehumidifying element;
a target current value determination unit that determines the value of a target current applied to the dehumidifying element until a predetermined target time in such a way that a predetermined target dehumidification amount is removed from the camera housing by the target time, on the basis of a first current value detected at the period start time of a predetermined current change judgment period and a second current value detected at the period end time of the period; and
a voltage control unit that controls the drive voltage applied to the dehumidifying element in such a way that the dehumidifying element is driven at the target current value until the target time.

2. The surveillance camera according to claim 1, wherein the target current value determination unit determines the target dehumidification amount on the basis of the change between the first and second current values.

3. The surveillance camera according to claim 1, wherein the period start time of the current change judgment period is set to a point immediately after the operation of the dehumidifying element is initiated.

4. The surveillance camera according to claim 1, further comprising a target time adjustment unit that adjusts the target time to an appropriate target time so that the target current value is an appropriate target current value smaller than or equal to the largest current value for the dehumidifying element.

5. A dehumidifier, comprising:
a dehumidifying element;
a current value detection unit that detects the value of the drive current applied to the dehumidifying element;
a target current value determination unit that determines the value of a target current applied to the dehumidifying element until a predetermined target time in such a way that a predetermined target dehumidification amount is removed by the target time, on the basis of a first current value detected at the period start time of a predetermined current change judgment period and a second current value detected at the period end time of the period; and
a voltage control unit that controls the drive voltage applied to the dehumidifying element in such a way that the dehumidifying element is driven at the target current value until the target time.

6. The dehumidifier according to claim 5, wherein the target current value determination unit determines the target dehumidification amount on the basis of the change between the first and second current values.

7. The dehumidifier according to claim 5, wherein the period start time of the current change judgment period is set to a point immediately after the operation of the dehumidifying element is initiated.

8. The dehumidifier according to claim 5, further comprising a target time adjustment unit that adjusts the target time to an appropriate target time so that the target current value is an appropriate target current value smaller than or equal to the largest current value for the dehumidifying element.

9. A dehumidification method, comprising:
detecting the value of the drive current applied to a dehumidifying element provided in a camera housing of a surveillance camera;
determining the value of a target current applied to the dehumidifying element until a predetermined target time in such a way that a predetermined target dehumidification amount is removed from the camera housing by the target time, on the basis of a first current value detected at the period start time of a predetermined current change judgment period and a second current value detected at the period end time of the period; and
controlling the drive voltage applied to the dehumidifying element in such a way that the dehumidifying element is driven at the target current value until the target time.

10. A dehumidification program for implementing a dehumidification capability of a surveillance camera based on the value of the drive current applied to a dehumidifying element provided in a camera housing of the surveillance camera, wherein
the program causes a computer to execute the procedure of:
determining the value of a target current applied to the dehumidifying element until a predetermined target time in such a way that a predetermined target dehumidification amount is removed from the camera housing by the target time, on the basis of a first current value detected at the period start time of a predetermined current change judgment period and a second current value detected at the period end time of the period; and
controlling the drive voltage applied to the dehumidifying element in such a way that the dehumidifying element is driven at the target current value until the target time.

* * * * *